(12) United States Patent
Morisita (10) Patent No.: US 6,559,974 B1
(45) Date of Patent: *May 6, 2003

(54) IMAGE PROCESSING METHOD AND APPARATUS WITH CORRECTING IMAGE DATA FEATURES

(75) Inventor: Kouichi Morisita, Tokyo (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/966,745

(22) Filed: Nov. 10, 1997

(30) Foreign Application Priority Data

Nov. 8, 1996 (JP) .............................. 8-296543

(51) Int. Cl.⁷ ............................................. G06K 15/00
(52) U.S. Cl. ......................... 358/1.9; 358/2.1; 358/462; 382/173; 382/176; 382/199
(58) Field of Search ................. 358/1.1–1.9, 1.11–1.18, 358/2.1, 462; 382/151, 274, 1.14, 173, 176, 199

(56) References Cited

U.S. PATENT DOCUMENTS

| 4,298,867 | A | * | 11/1981 | Craig | 340/728 |
|---|---|---|---|---|---|
| 5,276,531 | A | * | 1/1994 | Chen et al. | 358/443 |
| 5,386,294 | A | * | 1/1995 | Ototake | 356/401 |
| 5,390,264 | A | * | 2/1995 | Ishihara et al. | 382/54 |
| 5,410,414 | A | * | 4/1995 | Curry | 358/298 |
| 5,717,791 | A | * | 2/1998 | Labaere et al. | 382/274 |
| 5,856,877 | A | * | 1/1999 | Burger et al. | 358/452 |
| 5,912,985 | A | * | 6/1999 | Morimoto et al. | 382/151 |
| 6,075,894 | A | * | 6/2000 | Yano et al. | 382/199 |

\* cited by examiner

*Primary Examiner*—Gabriel Garcia
*Assistant Examiner*—King Y. Poon
(74) *Attorney, Agent, or Firm*—Oblon, Spivak, McClelland, Maier & Neustadt, P.C.

(57) ABSTRACT

An image forming apparatus and method includes an image data correcting feature. The image processing apparatus is configured to correct the image data based on the image type. The image processing apparatus has an input unit for inputting image data, a detector for detecting a slope of an edge of an image data from the input unit, a comparing circuit for comparing the slope of an edge of an image data from the detector with a preset slope data, a correcting circuit for correcting image data from the input unit according to the result of the comparing of the comparing circuit and an output unit for outputting image data from the correcting circuit. The outputted data, if corrected, more closely resembles a slope of an original image than that represented by the image data itself

15 Claims, 5 Drawing Sheets

BEFORE CORRECTING

*FIG. 5A*

AFTER CORRECTING

*FIG. 5B*

BEFORE CORRECTING

*FIG. 6A*

AFTER CORRECTING

*FIG. 6B*

IMAGE PROCESSING METHOD AND APPARATUS WITH CORRECTING IMAGE DATA FEATURES

BACKGROUND OF THE INVENTION

1. Field of the Invention

The present invention relates to an image processing method and apparatus like those employed in, for example, a laser beam printer and a light emitting diode (LED) printer, where an image is printed on a paper by way of arranging small pixels on a page in a particular arrangement with an associated resolution. More particularly, the present invention relates to image processing methods and apparatuses that employ image data correcting features that enhance the quality of a reproduced image that more closely resembles an original image.

2. Discussion of the Background

There have been laser beam printers, LED printers and other image processing devices that correct image data. These printers (or more generally apparatuses) write an image by laser beam or LED according to an inputted image data, and make a reproduction of the image by arranging small pixels on a paper or other image holding member. Among other things, these printers have to perform a function of converting multilevel signals to binary signals and, perform gray-scale image processing.

In these printers, an inputted image data is corrected by way of converting the multilevel signals to binary signals and performing gray-scale image processing on the binary signals and writing a resulting pattern of dots on the paper. Because an inputted image data is formatted as a multilevel signal, but printers can write only binary images (i.e., "black" and "white"), the conversion process is employed.

In these conventional printers, the process of the converting multilevel signals to binary signals and performing gray-scale image processing is changed according to the kind of the inputted image, for example, a text image and graphics image. In some of these printers, an operator selects the process manually according to the kind of the inputted image, as perceived by the operator.

Figure 5A:
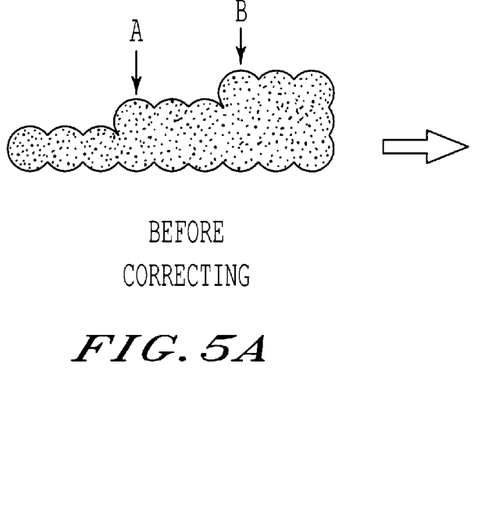
FIGS. 5A and 5B are enlarged views of the edge of a slanting line of a corrected and uncorrected image, respectively.
Figure 5B:
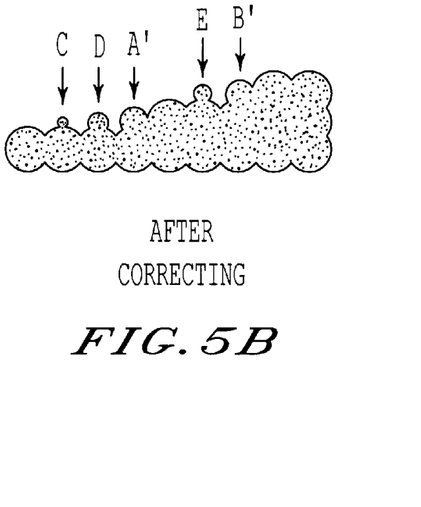

For a text image, the printers carry out a process of preventing jagged lines from being printed when the original image was a slanted line. FIG. 5 shows how the text image may be corrected where FIG. 5 is an enlarged view of an edge of a reproduced slanting line, and (A) is a diagram of before correcting and (B) is a diagram of after correcting. The pixels "a" and "b" in FIG. 5A are reduced in size to the corresponding pixels "a'" and "b'" in diagram (B). Also, the pixels c, d, and e are added as part of the correcting process. By this correcting, the jagged edge on slanting line becomes smooth or reasonably smooth when viewed by a reader.

Figure 6A:
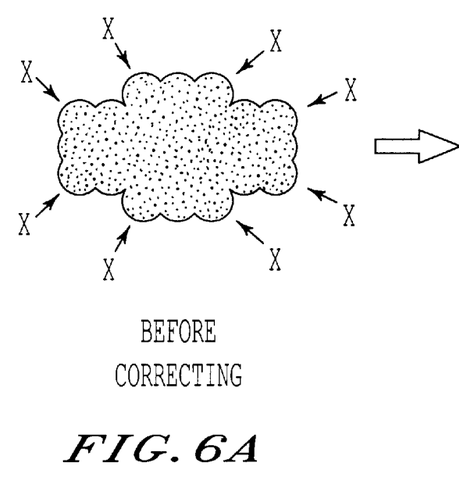
FIGS. 6A and 6B are enlarged views of a corrected and uncorrected dot image.
Figure 6B:
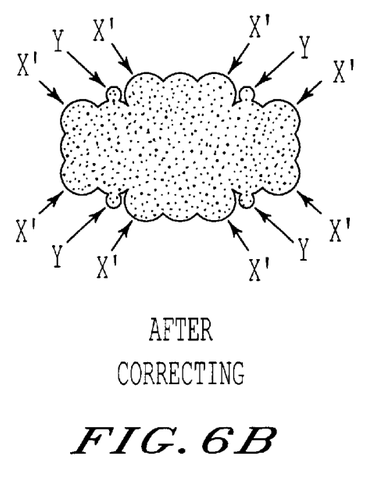

FIG. 6 is an enlarged view of a dot, which consists of several pixels and is used in a graphics image. The graphics image is made of many .dots by employing a dithering process, error diffusion and so on. A light and shade (density, gray-scale) of the graphic image is determined by the size of the dots. FIG. 6(A) is a diagram of before correcting and FIG. 6(B) is a diagram of the dot after correcting. In FIG. 6, the pixels "x" are reduced as "x'" and the pixels "y" are added to the existing dots as was done previously in FIG. 5B. Consequently, the jaggedness of the dot's edge is reduced (i.e., a periphery of the corrected dot appears to be smooth, relative to the dot in FIG. 6A). However, the size of dot is changed after the correcting. Therefore, after the correcting, the light and shade of the image is not correct because the size of dot is changed.

In the previously discussed conventional printer, correcting is not executed for the image graphic, because this, changing of the light and shade of the image is undesired. For the same reason, the correcting is not executed for mixed text-and-graphics images.

As determined by the present inventor, an effective amount of correcting is dependent on the subject matter contained in the image. For example, when the slope of a slanting line is big, an intense amount of correcting is needed because the jaggedness of the slanting line is quite conspicuous. On the other hand, when the slope of a slanting line is small, an intense amount of correcting is not needed because the jaggedness of the slanting line is somewhat inconspicuous.

SUMMARY OF THE INVENTION

Accordingly, an object of the present invention is to provide a novel image processing method and apparatus with correcting image data features which obviates the above-mentioned problems.

Another object is to provide an image processing apparatus with correcting image data features that executes the correcting process suitably for each kind of image.

A further object of the present invention is to provide an image processing apparatus with correcting image data features that correct images with mixed text-and-graphics.

To achieve the above-mentioned and other objects, there is provided an image forming method and apparatus that includes a correcting image data mechanism having an input for inputting image data, a detector for detecting a shape of an edge of the image data from the input, a correcting mechanism for correcting image data from the input according to said shape of the edge of an image data from the detector and an output for outputting image data from the correcting mechanism.

There is also provided an image forming apparatus that includes an input unit for inputting image data, a detector for detecting a slope of an edge of the image data from the input unit, a comparing circuit for comparing the slope of an edge of an image data from the detector with a preset slope data, a correcting circuit for correcting image data from the input unit according to the result of the comparing operation performed by the comparing circuit and an output unit that outputs the corrected image data from the correcting circuit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
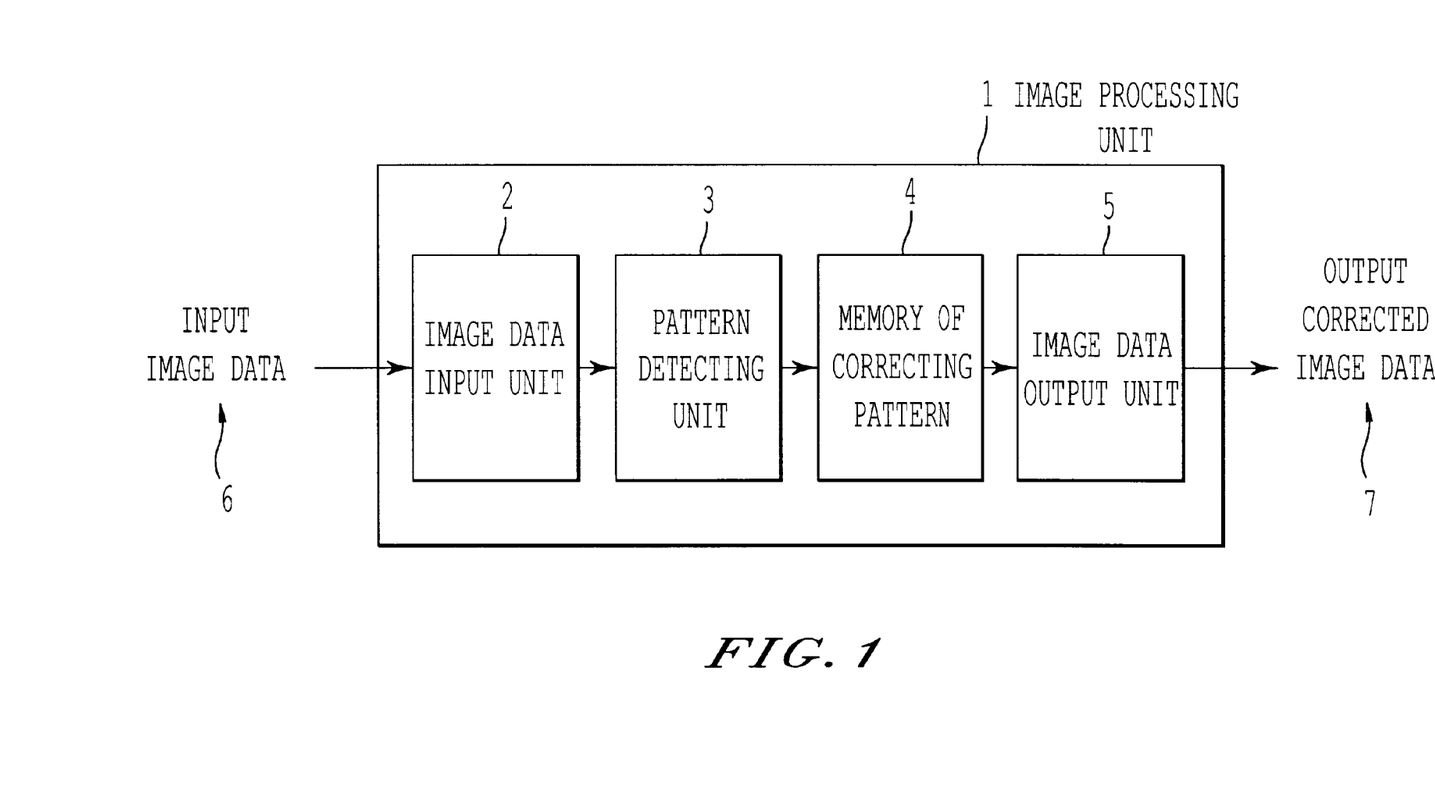
FIG. 1 is a block diagram of an image processing according to a first embodiment of the present invention.

Referring now to the drawings, wherein like reference numerals designate identical or corresponding parts throughout the several views, FIG. 1 is a block diagram of an image processing unit 1 used in an image processing apparatus according to present invention. The image processing unit 1 includes an image data input unit 2, a pattern detecting unit 3, a memory 4 that holds correcting patterns and an image data output unit 5.

An input image data 6 is input to the image data input unit 2 in the image processing unit 1. The inputted image data is sent to the pattern detecting unit 3, where the pattern detecting unit 3 detects the kind of an edge that is present (e.g., text/graphics, big/small) on the inputted image and sends a detection result to the memory 4 that holds the appropriate correcting pattern.

In the memory of correcting pattern 4 (which is implemented in a Random Access Memory, RAM, or other memory, including semiconductor memories) the inputted image data is corrected according to how the pattern detecting unit 3 (which may be implemented in a processor, discrete logic, programmable logic, or the like) characterizes the edge and type of the inputted image. When the inputted image is in the graphics image format, consisting of dots, a slope of the edge of the inputted image is small. The memory of correcting pattern 4 holds corresponding data for not correcting or correcting (e.g., smoothing by adjusting pixel sizes and adding small pixels where necessary) the image. When the small slope of the edge is determined to be small, the data held in memory 4 inhibits the correcting process from being executed because it is determined that the amount of correction needed is too insignificant. However, when a slope of the( edge of the inputted image is determined to be big, such as by comparing the detected slope of a text image to a predetermined threshold, the correcting process is executed. The corresponding correction pattern processes and alters the image to reduce the jaggedness of the edge of the image and sends the processed image data to the image data output unit 5, which then outputs the corrected image data 7. The altered image is changed at the pixel level, wherein the modification and addition of sub-pixel features is made to the respective pixels along the effected edge so that along the edge of the resulting image, an image resolution is greater than that offered by if only pixels themselves are used.

In this image processing apparatus, when the inputted image data is in the form of mixed text-and-graphics, the correcting process performed in units 3 and 4 is executed for the detected text portion but not for the graphics portion. Therefore, the edge of the text image portion becomes smooth and the lightness and shading of the graphics image portion is not effected.

Figure 2:
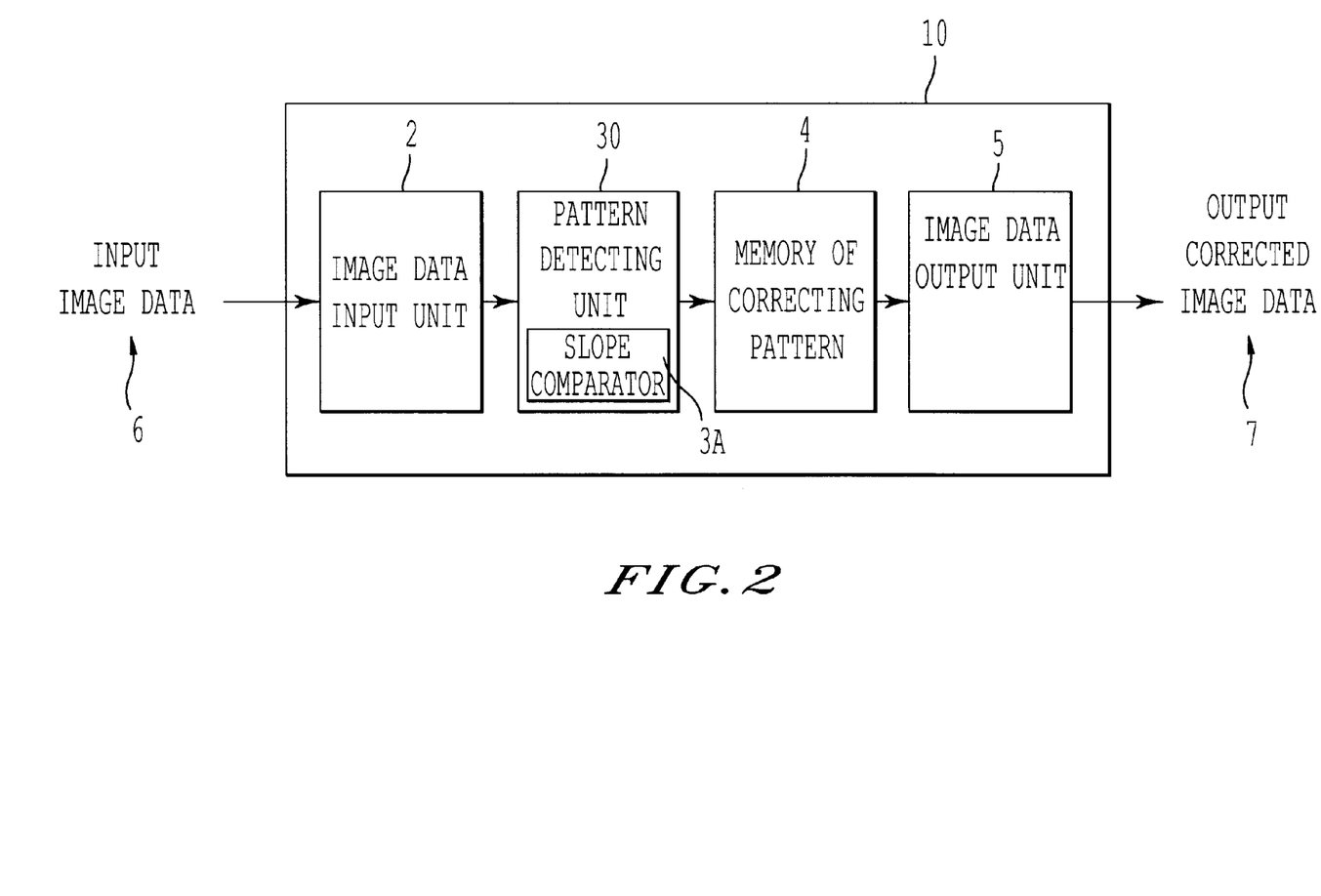
FIG. 2 is a block diagram of a second embodiment according to the present invention.

FIG. 2 is a block diagram of the second embodiment of the present invention. An image processing unit 10 includes an image data input unit 2, a pattern detecting unit 30, a memory of correcting pattern 4 and an image data output unit 5 interconnected by a bus (such as a backplane, when the respective components 2, 30, 4 and 5 are implemented on discrete processing boards, processors, or software modules executed in one or more processors). The pattern detecting unit 30 has a slope comparator 3a, but the other units of FIG. 2 are the same as those of FIG. 1.

Optionally, the correcting process may be changed by changing the preset value according to the type of detect, d input image data (e.g., text or graphics). The slope comparator 3a includes a register that holds one, or more, preset slope values used as thresholds for quantifying a degree of slope of the image edge. In the slope comparator 3a, the slope of the edge of the inputted image data is compared with the preset value (when only one is used) where the preset value is a variable that is either user-defined or adaptively set based on an automatic analysis of the image data prior to making the slope comparison. The data held in the memory of correcting pattern 4 is set so that if the slope of the edge of the inputted image data is smaller than the preset value, the correcting process is not executed and the image data is output without modification. However, if the slope of the edge of the inputted image data is bigger than the preset value, the correcting process is executed. If more than one preset values are used, the amount to which the correction process modifies the edge is a function of the detected degree of slope.

In the above-described image processing apparatus of the second embodiment, one of several image-type-dependent correcting processes may be selected in response to a change in the preset value according to the kind of image data. When all of the inputted image data is text, the correcting process is executed on the text data if the detected slope of the edge exceeds a relatively low preset value. However, if the inputted image data includes many graphic images (e.g., more graphics than text), the correcting process is not executed for the graphic image data unless the detected slope of the edge exceeds a relatively high preset value. In the special case of performing no correction for a large percentage of graphics images, the preset value is set above the dynamic range of the input image, such that the image is not corrected. Therefore, the second embodiment has an effect that the correcting process is adapted to the one type of image input to the image processing unit 10. Alternatively, once the image is detected as being either a text image or a graphics image, the slope of the edge is compared against a first preset value if a text image is detected, and compared against a second preset value if the image is detected as being a graphics image.

Figure 3:
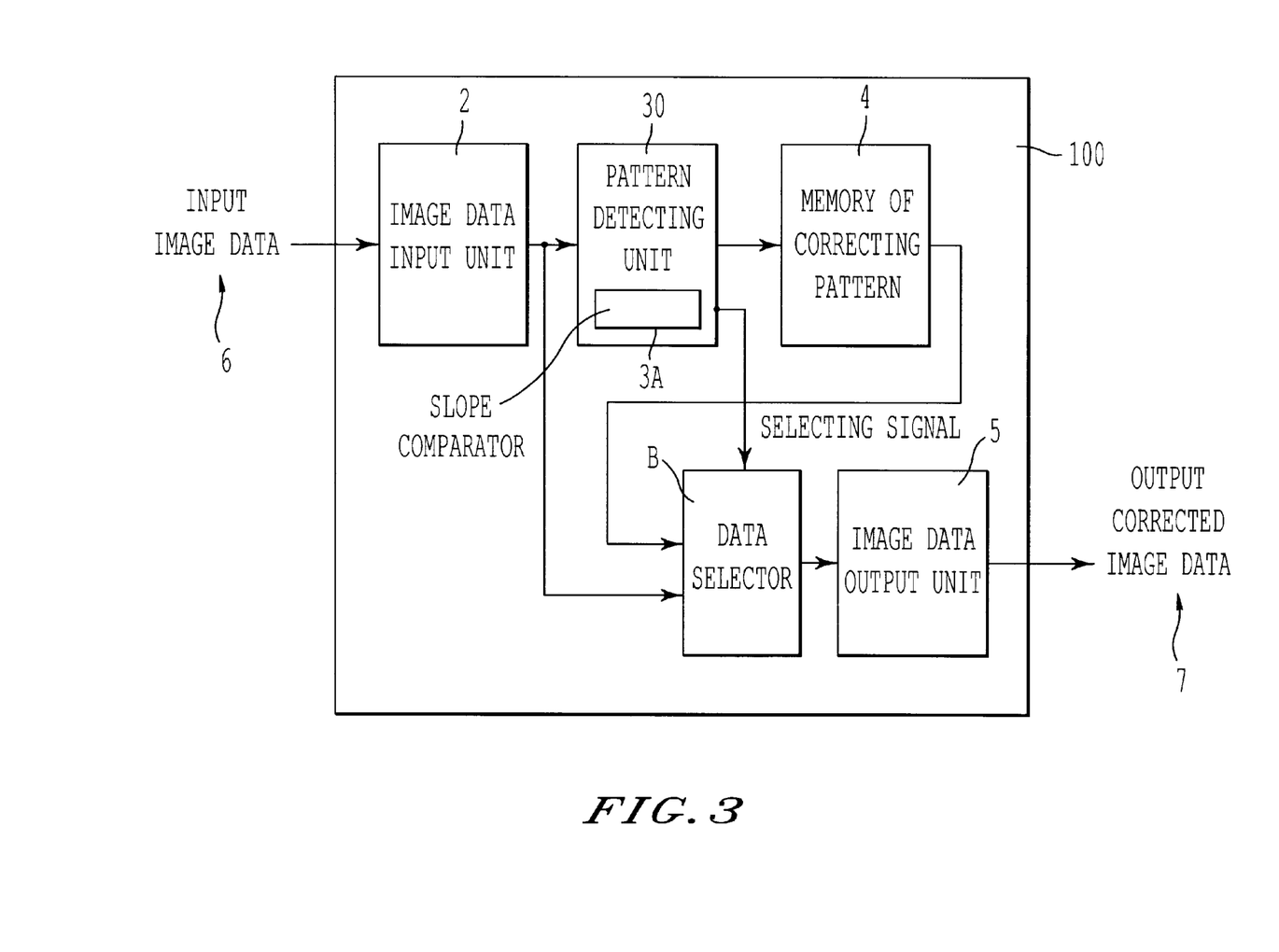
FIG. 3 is a block diagram of a third embodiment according to the present invention.

FIG. 3 is a diagram of the third embodiment of present invention. An image processing unit 100 includes an image data input unit 2, a pattern detecting unit 30 with a slope comparator 3a, a memory of correcting pattern 4, an image data output unit 5 and a data selector 8. The data selector 3 selects a data set from the image data input unit 2 or another data set from the memory of correcting pattern 4 according to a select signal from the slope comparator 3a in the pattern detecting unit 30. An operation of the image processing unit 100 is provided below.

Figure 4:
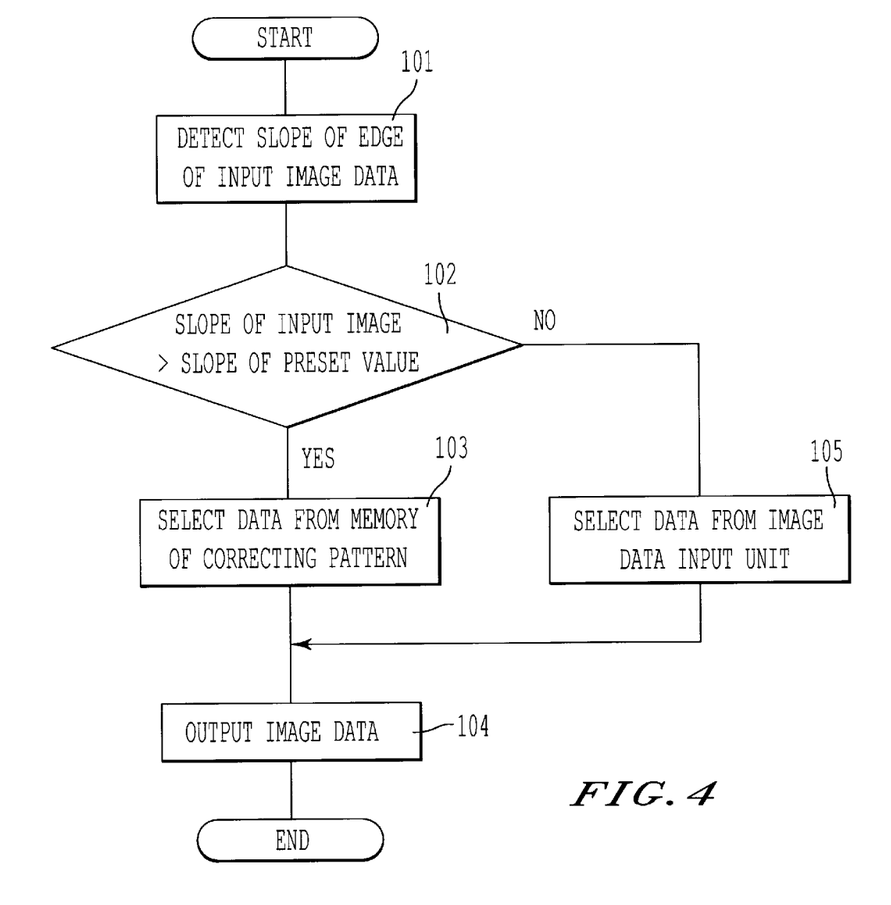
FIG. 4 is a flowchart of the image data correction third embodiment.

FIG. 4 is a flowchart of this image processing unit. At step 101, the pattern detecting unit 30 detects the slope of the edge of the inputted image data. The detected value is sent to the slope comparator 3a. The slope comparator 3a has contained therein a preset value (or alternatively multiple values, of the slope of the edge, and compares this preset value with the value of the slope of the edge of the inputted image data from the pattern detecting unit 3 (step 102).

When the detected value is bigger than the preset value of the slope of the edge, the data selector 8 selects (as replacement data, or alternatively invokes a process for altering the image data itself) the correct,d image data from the memory of correcting pattern 4 according to the selecting signal from the slope comparator 3a (step 103). This corrected image data from the memory of correcting pattern 4 is outputted (step 104) from the data selector 8 to the image data output unit 5. When the value of the slope of the edge of the inputted image data is smaller than the preset value of the slope of the edge, the data selector 8 selects the image data from the image data input unit 2 according to the selecting signal from the slope comparator 3a (step 105), and then uncorrected (original) image data from the image data input unit 2 is outputted (step 104).

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional components, as will be readily apparent to those skilled in the art.

This document is bas.ed on and claims priority to Japanese patent application 8-296543, filed in the Japanese Patent Office on Nov. 8, 1996, the entire contents of which are hereby incorporated by reference.

While the present invention has been explained in reference to the above-described embodiments, the specific features from the respective embodiments may be substituted and/or modified consistent with the features explained in reference to one or more of the embodiments.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An image processing apparatus with an image data correction feature comprising:
    an input unit configured to receive an image data including at least one of a text portion and a graphics portion;
    a detector configured to detect a slope of an edge of the image data;
    a comparing circuit configured to compare the slope of the edge of the image data with an adaptive preset slope threshold, the adaptive preset slope threshold being adaptively set based on determining a proportion of the text portion of the image data to the graphics portion of the image data prior to comparing the adaptive preset slope threshold with the slope detected by the detector;
    a correcting circuit configured to correct the image data when the comparing circuit determines that the slope is greater than the adaptive preset slope threshold by a predetermined amount; and
    an output unit for outputting the image data from said correcting circuit.

2. An image processing apparatus with an image data correction feature comprising:
    an input unit configured to receive an image data including at least one of a text portion and a graphics portion;
    a detector configured to detect a slope of an edge of the image data;
    a comparing circuit configured to compare the slope of the edge of the image data with an adaptive preset slope threshold, the adaptive preset slope threshold being adaptively set based on an analysis of the image data prior to comparing it with the slope detected by the detector, the analysis of the image data including a determination of a proportion of the text portion of the image data to the graphics portion of the image data;
    a correcting circuit configured to correct the image data when the comparing circuit determines that the slope is greater than the adaptive preset slope threshold by a predetermined amount; and
    an output unit for outputting the image data from said correcting circuit,
    wherein the comparing circuit is further configured to reset the preset slope threshold to a lower value when the analysis of the image data determines that the text portion of the image data is proportionally greater than the graphics portion of the image data.

3. An image processing apparatus with an image data correction feature comprising:
    an input unit configured to receive an image data including at least one of a text portion and a graphics portion;
    a detector configured to detect a slope of an edge of the image data;
    a comparing circuit configured to compare the slope of the edge of the image data with an adaptive preset slope threshold, the adaptive preset slope threshold being adaptively set based on an analysis of the image data prior to comparing it with the slope detected by the detector, the analysis of the image data including a determination of a proportion of the text portion of the image data to the graphics portion of the image data;
    a correcting circuit configured to correct the image data when the comparing circuit determines that the slope is greater than the adaptive preset slope threshold by a predetermined amount; and
    an output unit for outputting the image data from said correcting circuit,
    wherein the comparing circuit is further configured to reset the preset slope threshold to a higher value when the analysis of the image data determines that the graphics portion of the image data is proportionally greater than the test portion of the image data.

4. The image processing apparatus of claim 3, wherein the preset slope threshold is reset to a value greater than a dynamic range of the image data.

5. An image processing apparatus with an image data correction feature comprising:
    an input unit configured to receive an image data including at least one of a text portion and a graphics portion;
    a detector configured to detect a slope of an edge of the image data;
    a comparing circuit configured to compare the slope of the edge of the image data with a preset text image slope threshold when an analysis of the image data prior to comparing it with the slope detected by the detector determines that the image data includes more text than graphics and to compare the slope of the edge of the image data with a preset graphics image slope threshold when the analysis of the image data determines that the image data includes more graphics than text;
    a correcting circuit configured to correct the image data when the comparing circuit determines that the slope is greater than the preset text image slope threshold when the analysis of the image data determines that the image data includes more text than graphics and to correct the image data when the comparing circuit determines that the slope is greater than the preset graphics image slope threshold when the analysis of the image data determines that the image data includes more graphics than text; and an output unit for outputting the image data from said correcting circuit.

6. An image processing apparatus with an image data correction feature comprising:

an input unit configured to receive an image data including at least one of a text portion and a graphics portion;

a detector configured to detect a slope of an edge of the image data;

a comparing circuit configured to compare the slope of the edge of the image data with a preselected set of at least one slope thresholds to determine a selected one of the at least one slope thresholds having a value closest to the slope detected by the detecting circuit, the preselected set of the at least one slope thresholds being set based on determining a proportion of the text portion of the image data to the graphics portion of the image data prior to comparing the slope with the preselected set of the at least one slope thresholds;

a correcting circuit configured to correct the image data by modifying the image data by an amount determined as a function of the slope detected by the detector; and an output unit for outputting the image data from said correcting circuit.

7. An image processing method with an image data correction feature comprising the steps of:

inputting an image data including at least one of a text portion and a graphics portion;

detecting a slope of an edge of the image data;

comparing the slope of the edge of the image data with an adaptive preset slope threshold, the adaptive preset slope threshold being adaptively set based on determining a proportion of the text portion of the image data to the graphics portion of the image data prior to comparing the adaptive preset slope threshold with the slope;

correcting the image data when the slope is determined in the comparing step to be greater than the adaptive preset slope threshold by a predetermined amount; and outputting the image data corrected in the correcting step.

8. An image processing method with an image data correction feature comprising the steps of:

inputting an image data including at least one of a text portion and a graphics portion;

detecting a slope of an edge of the image data;

comparing the slope of the edge of the image data with an adaptive preset slope threshold, the adaptive preset slope threshold being adaptively set based on an analysis of the image data prior to comparing it with the slope detected in the detecting step, the analysis of the image data including a determination of a proportion of the text portion of the image data to the graphics portion of the image data;

correcting the image data when the slope is determined in the comparing step to be greater than the adaptive preset slope threshold by a predetermined amount; and outputting the image data corrected in the correcting step, wherein the comparing step further comprises resetting the preset slope threshold to a lower value when the analysis of the image data determines that the text portion of the image data is proportionally greater than the graphics portion of the image data.

9. An image processing method with an image data correction feature comprising the steps of:

inputting an image data including at least one of a text portion and a graphics portion;

detecting a slope of an edge of the image data;

comparing the slope of the edge of the image data with an adaptive preset slope threshold, the adaptive preset slope threshold being adaptively set based on an analysis of the image data prior to comparing it with the slope detected in the detecting step, the analysis of the image data including a determination of a proportion of the text portion of the image data to the graphics portion of the image data;

correcting the image data when the slope is determined in the comparing step to be greater than the adaptive preset slope threshold by a predetermined amount; and outputting the image data corrected in the correcting step, wherein the comparing step further comprises resetting the preset slope threshold to a higher value when the analysis of the image data determines that the graphics portion of the image data is proportionally greater than the text portion of the image data.

10. The method of claim 9, wherein the comparing step further comprises resetting the preset slope threshold to a value greater than a dynamic range of the image data.

11. An image processing method with an image data correction feature comprising the steps of:

inputting an image data including at least one of a text portion and a graphics portion;

detecting a slope of an edge of the image data;

comparing the slope of the edge of the image data with a preset text image slope threshold when an analysis of the image data prior to comparing it with the slope detected in the detecting step determines that the image data includes more text than graphics;

comparing the slope of the edge of the image data with a preset graphics image slope threshold when the analysis of the image data determines that the image data includes more graphics than text;

correcting the image data when it is determined that the slope is greater than the preset text image slope threshold when the analysis of the image data determines that the image data includes more text than graphics;

correcting the image data when it is determined that the slope is greater than the preset graphics image slope threshold when the analysis of the image data determines that the image data includes more graphics than text; and outputting the image data corrected in the correcting step.

12. An image processing method with an image data correction feature comprising the steps of:

inputting an image data including at least one of a text portion and a graphics portion;

detecting a slope of an edge of the image data;

comparing the slope of the edge of the image data with a preselected set of at least one slope thresholds to determine a selected one of the at least one slope thresholds having a value closest to the slope detected in the detecting step, the preselected set of the at least one slope thresholds being set based on determining a proportion of the text portion of the image data to the graphics portion of the image data prior to comparing the slope with the preselected set of the at least one slope thresholds;

correcting the image data by modifying the image data by an amount determined as a function of the slope detected in the detecting step; and outputting the image data corrected in the correcting step.

13. An image processing apparatus with an image data correction feature comprising:

means for inputting an image data including at least one of a text portion and a graphics portion;

means for detecting a slope of an edge of the image data;

means for comparing the slope of the edge of the image data with an adaptive preset slope threshold, the adaptive preset slope threshold being adaptively set based on determining a proportion of the text portion of the image data to the graphics portion of the image data prior to comparing the adaptive preset slope threshold with the slope;

means for correcting the image data when the slope is determined by the means for comparing to be greater than the adaptive preset slope threshold by a predetermined amount; and means for outputting the image data from said means for correcting.

14. An image processing apparatus with an image data correction feature comprising:

means for inputting an image data including at least one of a text portion and a graphics portion;

means for detecting a slope of an edge of the image data;

means for comparing the slope of the edge of the image data with a preset text image slope threshold when an analysis of the image data prior to comparing it with the slope detected by the means for detecting determines that the image data includes more text than graphics;

means for comparing the slope of the edge of the image data with a preset graphics image slope threshold when tile analysis of the image data determines that the image data includes more graphics than text;

means for correcting the image data when it is determined that the slope is greater than the preset text image slope threshold when the analysis of the image data determines that the image data includes more text than graphics;

means for correcting the image data when it is determined that the slope is greater than the preset graphics image slope threshold when the analysis of the image data determines that the image data includes more graphics than text; and means for outputting the image data from said means for correcting.

15. An image processing apparatus with an image data correction feature comprising:

means for inputting an image data including at least one of a text portion and a graphics portion;

means for detecting a slope of an edge of the image data;

means for comparing the slope of the edge of the image data with a preselected set of at least one slope thresholds to determine a selected one of the at least one slope thresholds having a value closest to the slope detected by the means for detecting, the preselected set of the at least one slope thresholds being set based on determining a proportion of the text portion of the image data to the, graphics portion of the image data prior to comparing the slope with the preselected set of the at least one slope thresholds;

means for correcting the image data by modifying the image data by an amount determined as a function of the slope detected by the means for detecting; and means for outputting the image data from said means for correcting.

* * * * *